Sept. 27, 1927.  S. PULASKI  1,643,751
TROLLEY POLE
Filed Feb. 15, 1927
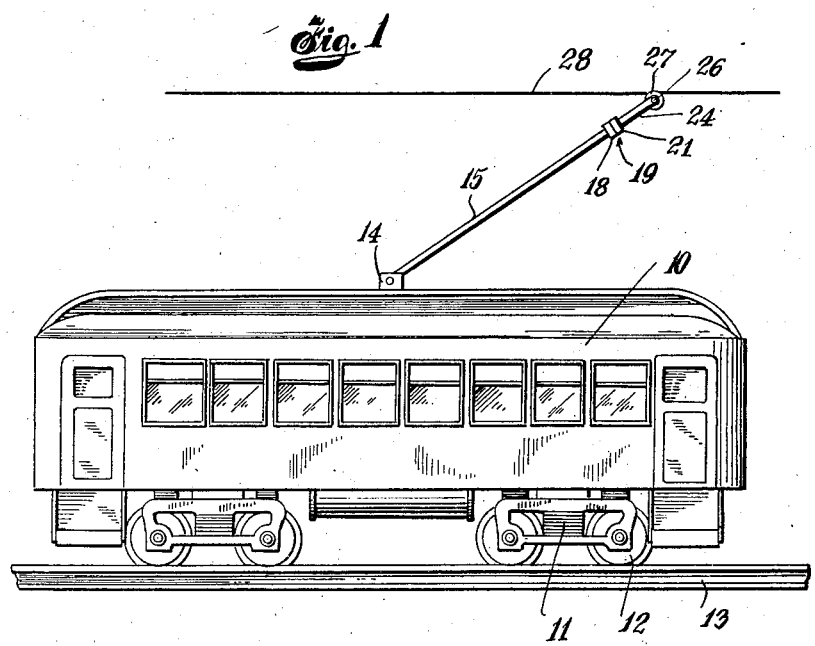
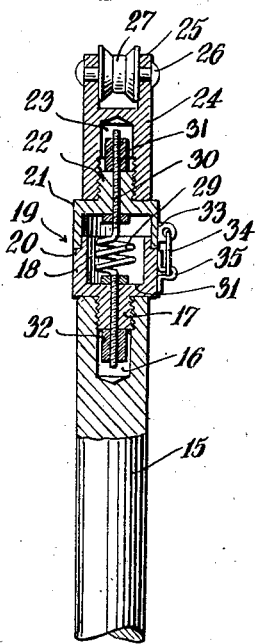
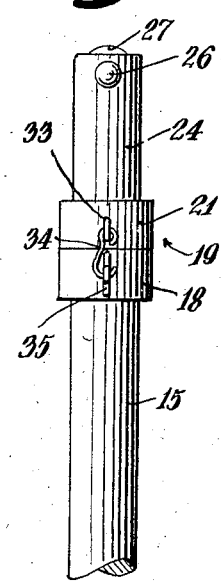
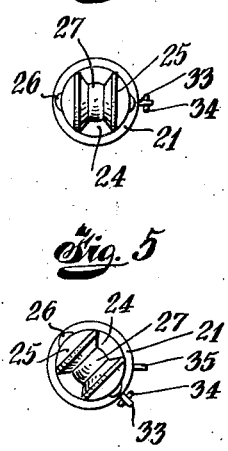
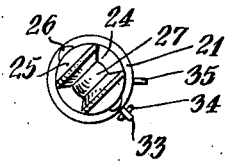
Inventor
Stanley Pulaski
By his Attorney Patented Sept. 27, 1927.

1,643,751

UNITED STATES PATENT OFFICE.

STANLEY PULASKI, OF BROOKLYN, NEW YORK.

TROLLEY POLE.

Application filed February 15, 1927. Serial No. 168,252.

This invention relates to conductors and more particularly to such electrical transmitting devices commonly known as trolleys.

It has been found, in the past, that while rounding a turn, the car trolley very often left the conductor feed wire, causing a loss of time to replace the same.

The reason for such disadvantage appeared to reside in the fact that the pole was made of unitary construction so that naturally if the car is in one plane and the conductor feed wire in another, the chances of the connection therebetween remaining intact are slight.

It is therefore an object of this invention to provide a trolley-pole having means incorporated therein enabling a positive connection, at all times, between the third rail and the car.

A further aim is in the provision of means whereby the trolley-pole is caused to return to its normal position after functioning during the car's rounding a turn.

These several objects, together with other minor advantages, which will appear as the description progresses, are accomplished by the novel construction, combination and arrangement of parts, hereinafter described and illustrated in the accompanying drawing, forming an important component of this disclosure, and in which:—

Figure 1 is a side elevational view of a conventional trolley car equipped with an embodiment of this invention.

Figure 2 is a fragmentary, detailed, partial vertical sectional of the trolley pole, drawn to an increased scale.

Figure 3 is a side elevational view of the same.

Figure 4 is a top plan view of the device in an operative position.

Figure 5 is a like view of the same in an inoperative position.

In the drawing, the numeral 10 generally designates a conventional trolley car having trucks 11 provided with wheels 12 engaging rails 13.

Centrally located on the car roof is a bracket 14 in which is pivoted a solid pole 15 having a partially threaded, circular recess 16 in its upper end.

Engageable in the recess is the threaded stem 17 of the cylindrical base element 18 of a coupling 19, the base being provided with a seat 20 on which rests a similar top element 21 having a threaded stem 22 engageable in a partially threaded recess 23 formed in an upper pole member 24 having a forked outer extremity 25 in which is secured an axle 26 carrying a trolley wheel 27 adapted to engage an overhead wire 28.

Intermediate the elements 18 and 21 is a coil spring 29 having its ends screw threaded as at 30 and passing axially through the stems 17 and 22, the ends being anchored by nuts 31 at the inner ends of the stems and nuts 32 at the outer ends thereof.

Formed on the upper member 21 is a lug 33 carrying a catch 34 removable engageable with a keeper 35 fixed on the lower element 18.

Thus, while the car is rounding a turn, it is obvious that the pole 15 will follow in the same plane as the car.

However, through the coupling 19 the upper pole element 24 will follow the path of the wire 28.

In this manner, a positive connection is procured between the source of current and the car so that no time is lost by the wheel 27 disengaging the wire 28 and trouble is therefore avoided.

While the foregoing is descriptive of the preferred embodiment of the device, it is obvious, minor changes may be made without departing from the scope of the appended claims.

Having thus described my invention, what I claim as new and desire to secure by Letters Patent, is:—

1. A car trolley comprising a pole having a recess, a second pole having a similar recess, a coupling therebetween, said coupling comprising a pair of cup-like elements engaging the pole recesses, a connection between said cup-like elements and a wheel rotatable in said upper pole member.

2. A car trolley comprising a recessed pole, a second pole having a wheel rotatable in its outer end, and a coupling between said poles, said coupling comprising a base member fixed to said first pole, a similar upper member fixed to said second pole and a coil spring intermediate said base and upper members, the ends of which are anchored therein.

In witness whereof I have affixed my signature.

STANLEY PULASKI.